United States Patent [19]

Taylor

[11] 4,436,109

[45] Mar. 13, 1984

[54] MAGNETICALLY COUPLED POSITIVE ACTING LEVEL CONTROL

[76] Inventor: Wesley L. Taylor, 8300 SW. 8, Oklahoma City, Okla. 73108

[21] Appl. No.: 469,847

[22] Filed: Feb. 25, 1983

[51] Int. Cl.³ .................... F16K 31/34; F16K 31/126
[52] U.S. Cl. ............................. 137/413; 137/414;
137/416; 137/448; 137/596.14; 137/625.6;
251/65
[58] Field of Search .............. 137/412, 413, 414, 416,
137/448, 596.14, 625.6; 251/65

[56] References Cited

U.S. PATENT DOCUMENTS

| | | | |
|---|---|---|---|
| 1,894,367 | 1/1933 | Corcoran | 137/416 |
| 2,626,594 | 1/1953 | Kimmell | 137/412 |
| 2,752,932 | 7/1956 | Newboult | 251/65 |
| 2,893,427 | 7/1959 | Felgate | 137/448 |
| 3,052,254 | 9/1962 | Parks | 137/414 |
| 3,058,485 | 10/1962 | McQueen | 137/414 |
| 3,519,019 | 7/1970 | Rieschel | 137/625.6 |
| 3,529,629 | 9/1970 | Cowan | 137/625.6 |
| 3,822,933 | 7/1974 | Johnson | 251/65 |

Primary Examiner—George L. Walton
Attorney, Agent, or Firm—Robert K. Rhea

[57] ABSTRACT

A liquid level control utilizing magnetic repulsion for raising and lowering a lever for venting or closing a gas pressure supply path to move a valve assembly, in the gas pressure supply path, in a relay-type snap action for opening or closing a valve controlling the liquid input and output of a vessel in response to the rise and fall of a float assembly with the liquid level.

16 Claims, 12 Drawing Figures

MAGNETICALLY COUPLED POSITIVE ACTING LEVEL CONTROL

BACKGROUND OF THE INVENTION

1. Field of the Invention

The present invention relates to liquid level control apparatus and more particularly to controlling the liquid level within pressure vessels as used in the oil and gas industry, such as a gas scrubber.

2. Description of the Prior Art

Liquid level controls usually include a float located inside of a vessel in which the float has a connection by a shaft or an operating member, extending through the wall of the vessel, with a mechanism located exteriorly of the vessel which operates a liquid outlet or dump valve. In such an arrangement, the float movement with the rise and fall of the liquid level functions to open and close the outlet or dump valve thus maintaining a predetermined liquid level within the vessel. One of the problems of prior liquid level controls has been obtaining a positive "open" or "closed" control signal for a liquid drain or supply valve when a liquid float is disposed in a neutral position between a liquid level "high" or "low" position. This results in an arcing and burning of contacts, in an electric operated level control or a bypass to atmosphere waste of gas pressure supply in a gas pressure operated liquid level control.

The most pertinent patent is believed U.S. Pat. No. 3,822,933 which discloses a housing threadedly inserted at one end through one wall of a vessel. The inward end of the housing is provided with a longitudinal cavity pivotally supporting an arm connected with a float raised and lowered by fluid in the vessel. The end of the arm opposite the float supports a magnet which magnetically attracts a second magnet upon downward movement of the float to pivot a second lever pivotally supported in a second cavity of the housing, parallel with the first cavity, to cover or uncover an orifice connected with a source of pressure. As the orifice is gradually closed by the lever in a throttling action the pressure source actuates a motor control valve for actuating a motor in turn controlling the input or output of vessel liquid.

The present invention solves the above problem and is distinctive over the prior art and the above patent by an unbalanced valve assembly biased "open" or "closed" in a snap action to respectively open or close a fluid outlet or dump valve in response to the rise and fall of a liquid level in a vessel.

SUMMARY OF THE INVENTION

A centrally bored elongated body is threadedly connected at one end with the wall of a vessel. An isolation tube, axially supported by the body, has its closed end projecting into the vessel and surrounds one end portion of a flapper lever supported by the body for vertical pivoting movement. The vessel end of the flapper lever contains a flapper magnet. A float, mounted on a float arm, pivotally connected with the isolation tube, supports a float magnet in proximity with the flapper magnet for magnetic repulsion between the magnets and vertical movement of the flapper lever in response to the rise and fall of the float with liquid within the vessel. The outward end of the body supports valve housings having cooperating bores formed therein coaxial with an offset bore and valve seat in the outer end portion of the body communicating with lateral body bores, one lateral body bore being connected with a gas supply pressure and the other lateral bore forming a dump valve operating pressure source. The valve housing bores are transversely divided by a pair of spaced diaphragms supporting a valve assembly for axial movement toward and away from the body valve seat. Supply pressure is normally applied to the valve assembly and one side of one diaphragm through restrictive bores to bias the diaphragm and valve assembly in one direction in a snap action and maintain the valve assembly in dump valve closed position. The restrictive bores communicate with the atmosphere through a nozzle having an orifice opened and closed by movement of the flapper lever as a function of the position of the float magnet. The area between the diaphragms being open to the atmosphere so that when the liquid in the vessel lifts the float beyond a predetermined level the nozzle orifice is opened to atmosphere permitting supply pressure against the other diaphragm to bias the valve assembly in an opposite direction in a snap action for applying supply pressure to open the dump valve and lower the liquid level in the vessel.

The principal objects of this invention are to provide an easily serviced in the field relay-type positive snap action liquid level control for controlling the liquid level in a vessel by magnetic repulsion between two members as a function of the position of a float raising and lowering a lever, isolated from the liquid in the vessel, triggering a snap acting valve assembly open or closed which operates a liquid outlet or dump valve.

DESCRIPTION OF THE PREFERRED EMBODIMENTS

Like characters of reference designate like parts in those figures of the drawings in which they occur.

Figures 1, 4:
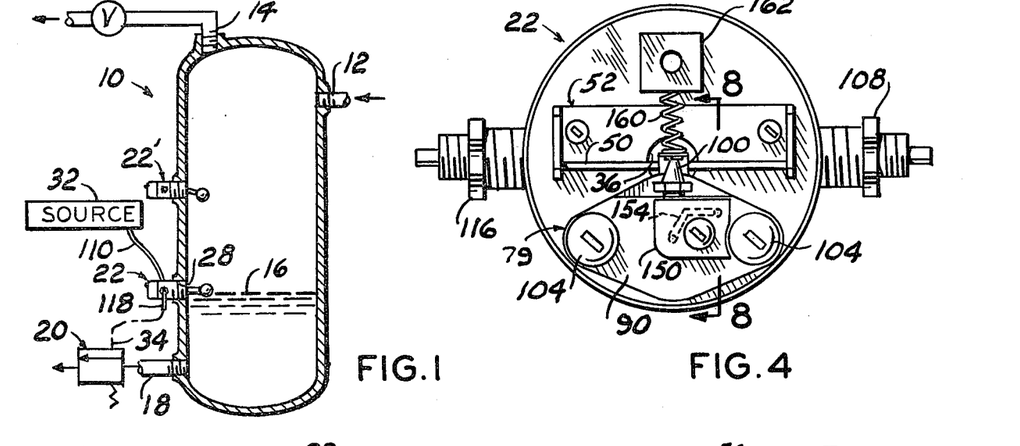
FIG. 1 is a diagram illustrating the level control installed in a gas scrubber.
FIG. 4 is a left end elevational view of FIG. 2.

In the drawings:

The reference numeral 10 diagrammatically indicates a substantially conventional gas scrubber having gas inlet and outlet ports 12 and 14 for separating liquid 16 from the gas which collects in the bottom portion of the scrubber. The scrubber is provided with a drain line 18 having a dump valve 20 therein for removing the liquid 16 when it reaches a predetermined level. The gas scrubber 10 forms no part of the invention other than to set forth, as an example, the use of the level control apparatus, indicated by the numeral 22.

Figure 2:
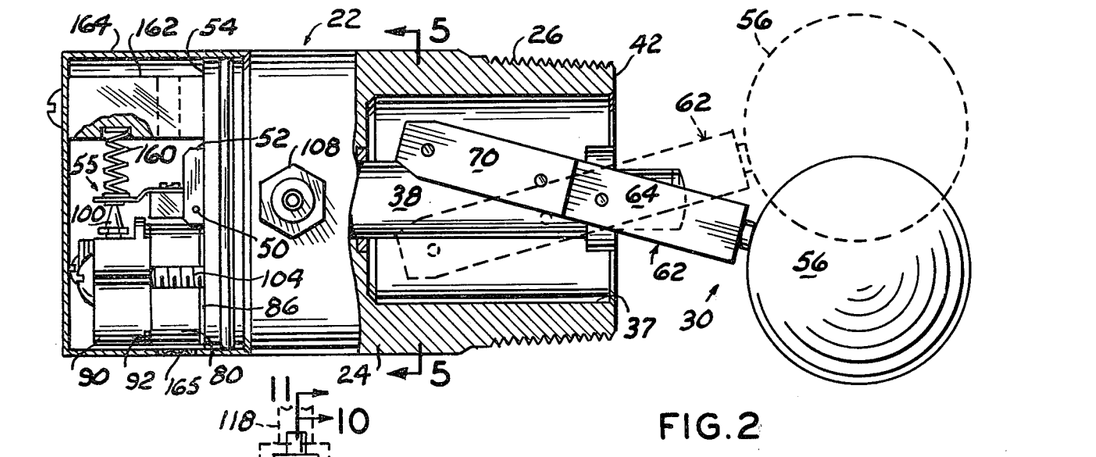
FIG. 2 is a side elevational view of the level control, per se, to a larger scale, partially in section, illustrating, by dotted lines, the upper limit of float movement.
Figure 3:
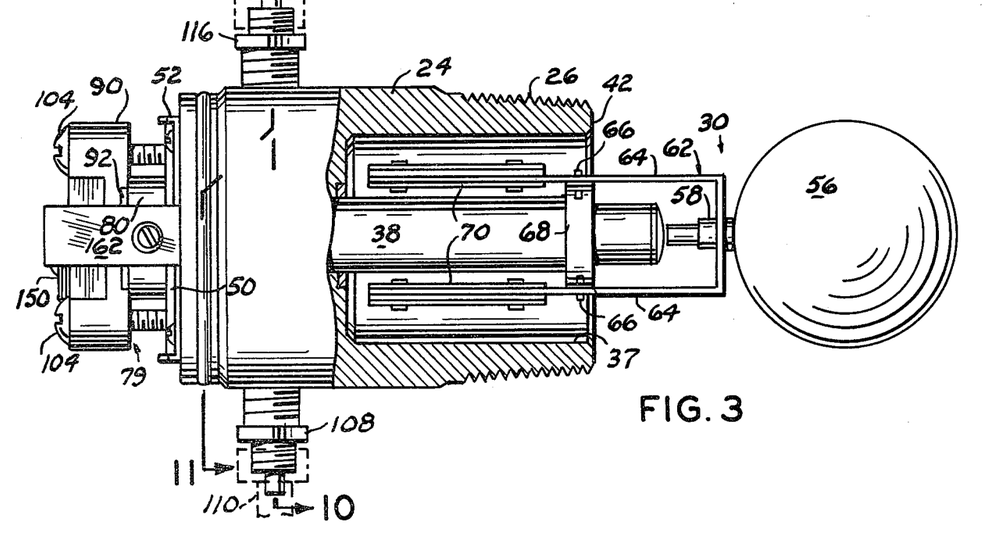
FIG. 3 is a top view of the level control partially in section.

The level control 22, preferably formed from nonmagnetic material, comprises a generally cylindrical body 24 having external threads 26 at one end for threadedly entering, horizontally, a port 28 in the wall of the scrubber at a desired elevation. The inward threaded end of the body pivotally supports a float means 30, later described in more detail, which rises and falls with the level of liquid 16 and controls a source of pressure 32 connected with the body 24 for actuating the diaphragm actuator 34 of the dump valve 20 in response to movement of the float means 30 above a predetermined level, as presently explained.

The body 24 is centrally bored and counterbored, from its threaded end, as at 36 and 37. The bore 36 receives a socket forming isolation member or tube 38 sealed with the body by an O-ring 40. The isolation tube 38 projects beyond the inward end 42 of the body and is sealed fluid tight, for the purposes believed apparent. The isolation tube 38 loosely receives an elongated flapper lever 44 (FIG. 12) having a flapper permanent magnet 46 axially secured in its end portion adjacent the inner closed end of the isolation tube and is connected at its other end with a flapper pivot bushing 48 in turn secured to a flapper pivot shaft 50 horizontally journalled by a pivot support bracket 52 secured to the outer end surface 54 of the body 24 for vertical pivoting movement of the magnet contained end portion of the flapper lever within the confines of the isolation tube. The flapper lever 44 operates flapper means 55, for the purpose presently apparent.

Figure 5:
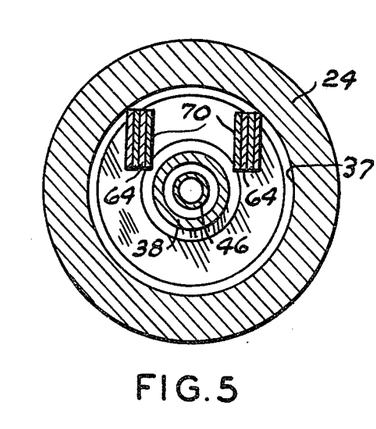
FIG. 5 is a vertical cross sectional view taken substantially along the line 5—5 of FIG. 2.
Figure 12:
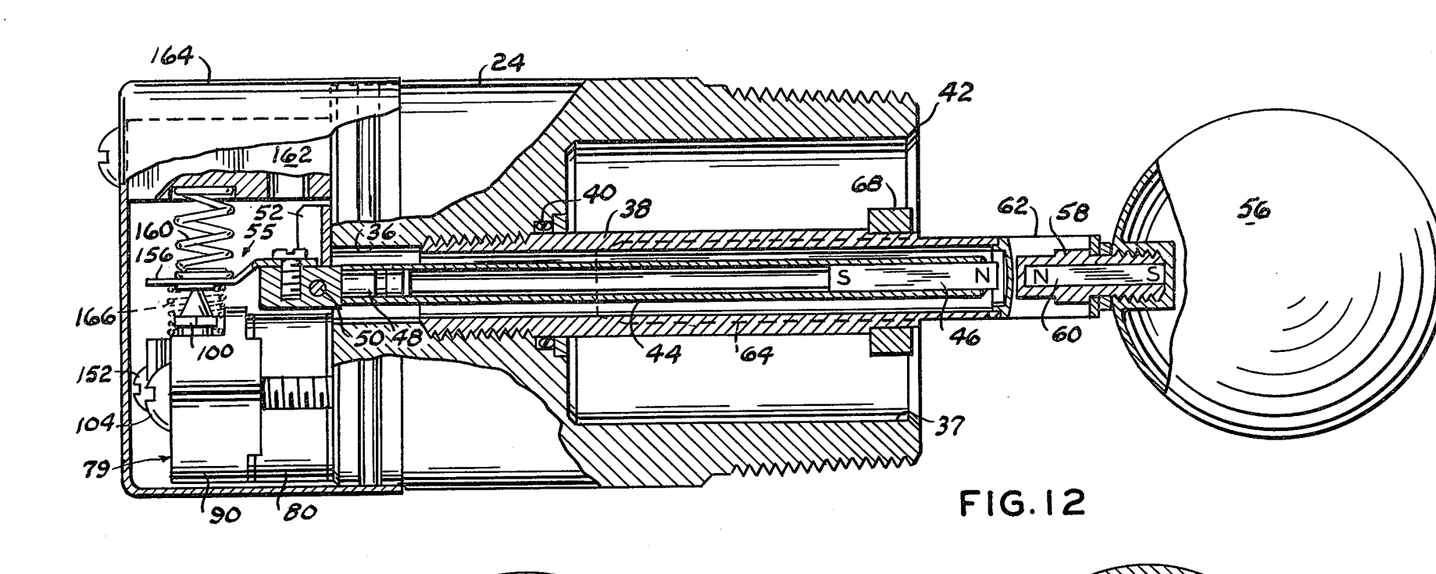

The float means 30 comprises a ball-like float 56 threadedly connected with a hollow float magnet holder 58 having a float permanent magnet 60 axially disposed therein (FIG. 12). The float magnet holder 58 is supported by the bight portion of a U-shaped float arm 62 having legs 64 which are pivotally mounted intermediate their ends on pins 66 entering a pivot ring 68 surrounding and secured to the inward end portion of the isolation tube. The float arm legs 64 project into the body counterbore 37 and are provided with counterweights 70. The magnets 46 and 60 are disposed with like poles adjacent each other so that when the float 56 is in the solid line position of FIG. 2 magnetic repulsion of the magnets pivots the flapper lever 44 upwardly and, conversely, when the float 56 is in the dotted line position of FIG. 2, magnetic repulsion pivots the flapper lever 44 downwardly for the purposes presently explained. As shown by FIG. 5, the curvature of the body counterbore 37 limits the vertical pivoting movement of the float arm legs 64 to the positions shown by solid and dotted lines in FIG. 2.

Figure 6:
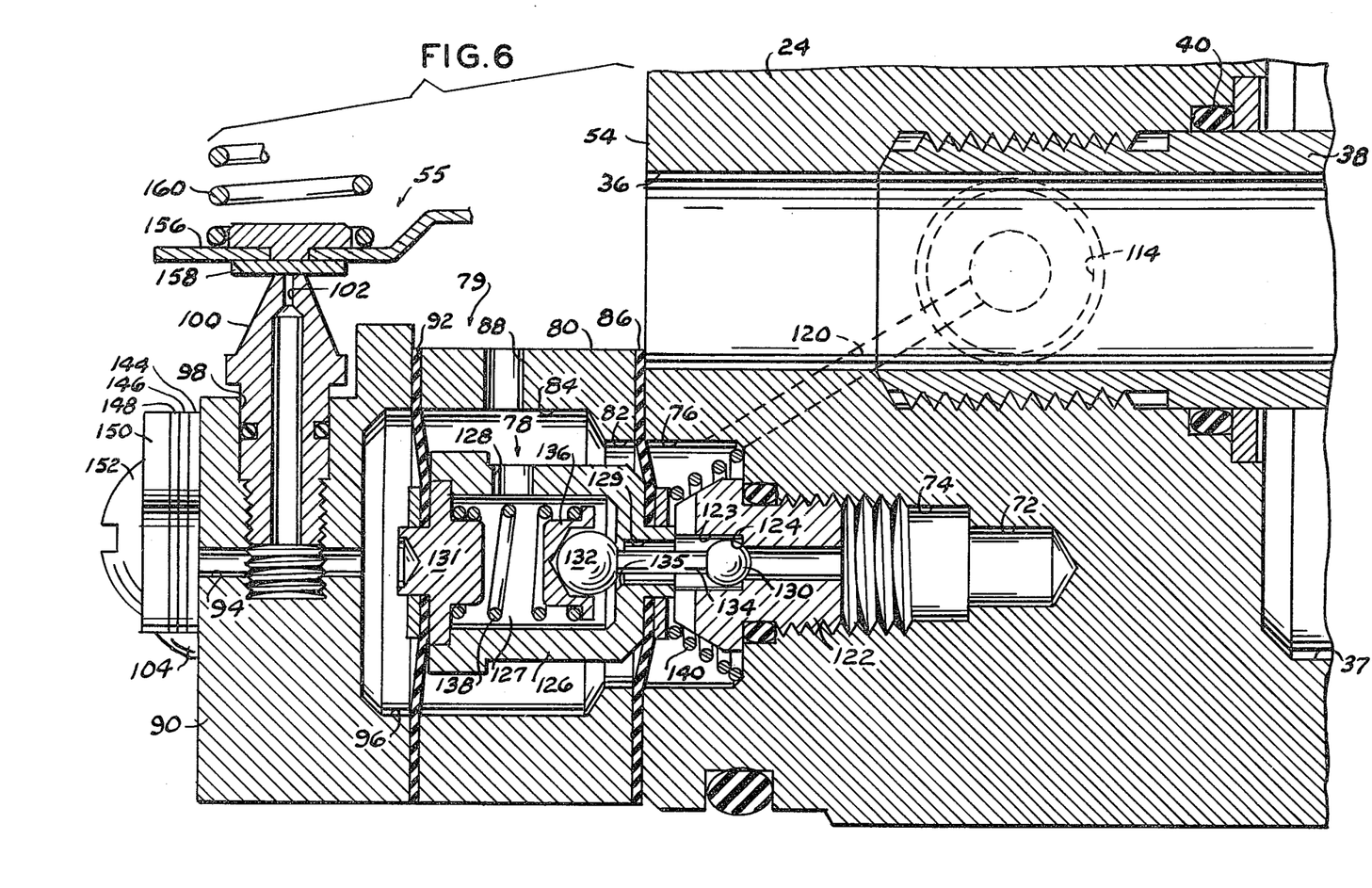
FIG. 6 is a fragmentary vertical cross sectional view, to an enlarged scale, of the depending outer end portion of the level control, illustrating the position of the diaphragms and valve assembly when the float is below a predetermined liquid level.
Figure 7:
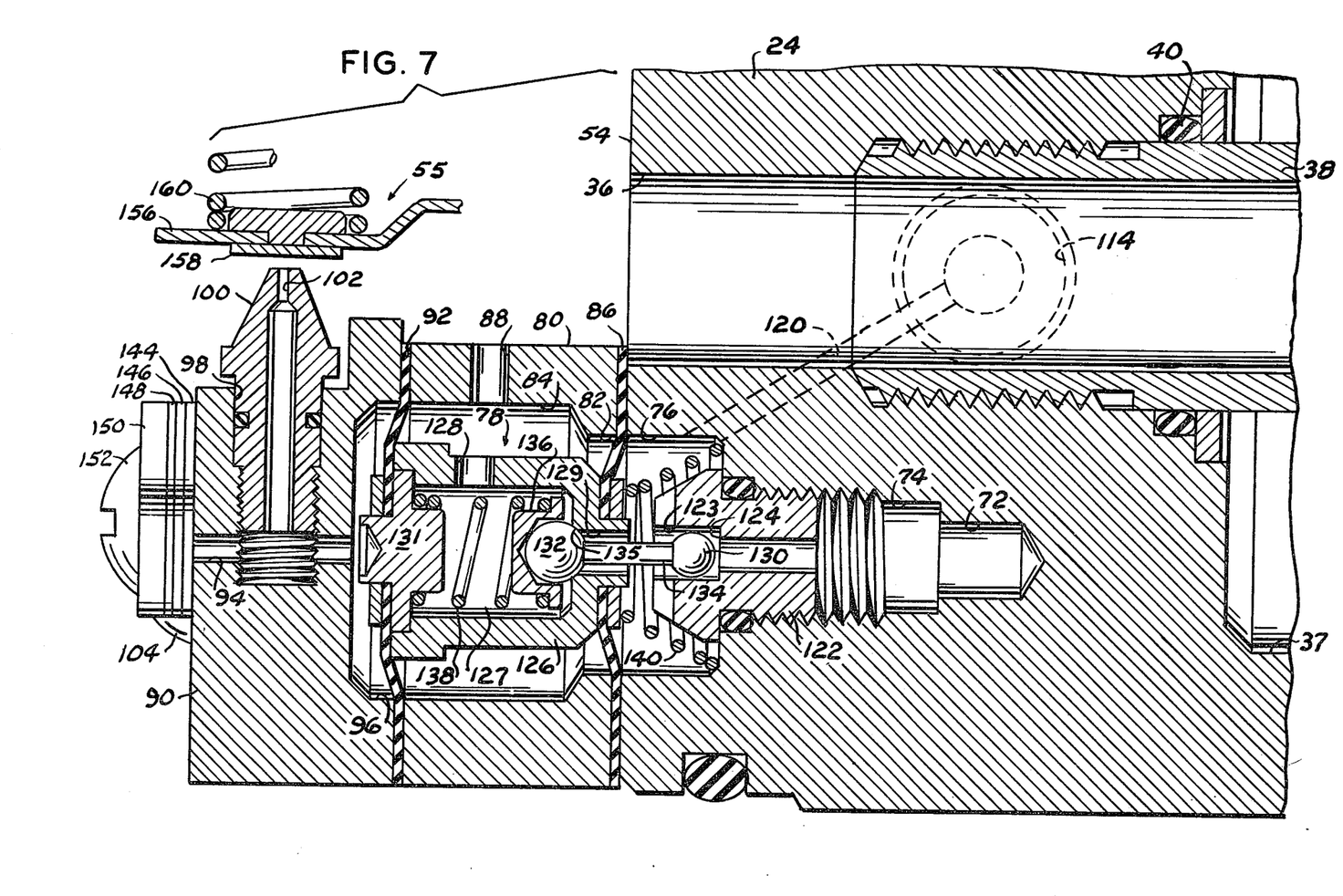
FIG. 7 is a view similar to FIG. 6 illustrating the position of the diaphragms and valve assembly when the liquid level is above a preferred level.

Referring more particularly to FIGS. 6 and 7, the body 24 is bored and counterbored, as at 72, 74 and 76, from its outer end 54 in downwardly offset relation, as viewed in the drawings, with respect to the central bore 36 which cooperates with control valve means 78, as presently explained. Valve housing means 79 includes a relay center ring 80, having a central bore 82, diametrically equal with the counterbore 76, which axially abuts the body forward end 54 coaxial with the body counterbore 76. The relay ring 80 is counterbored, as at 84, opposite the body, for the purposes presently explained.

A first diaphragm 86 is interposed between the center ring 80 and the forward surface 54 of the body. The wall of the center ring 80 is apertured, as at 88, for atmospheric communication with its interior.

The valve housing means 79 further includes a pilot valve cap 90, generally ovate in end elevation (FIG. 4), flatly abutting the end of the center ring 80 opposite the body outer end surface 54 with a second diaphragm 92 interposed therebetween. The valve cap 90 is bored, to form a pressure supply restrictive bore 94, coaxial with the bores of the center ring 80 and is counterbored, as at 96 to form a pressure chamber, on a diameter equal and coaxial with the center ring counterbore 84. The valve cap is provided with a vertical bore 98, as viewed in the drawings, intersecting its axial bore 94. A centrally bored nozzle 100 is threadedly received by the valve cap bore 98 and projects upwardly above the valve cap a selected distance. The nozzle is characterized by a converging upper end and its bore 102 forms an orifice opened and closed by the flapper means 55 as presently explained.

The center ring 80 and valve cap 90 are secured to the outer end 54 of the body by screws 104 extending through respective end portions of the valve cap 90 on diametrically opposite sides of the center ring 80 and threadedly engaged with the end portion of the body.

Figure 10:
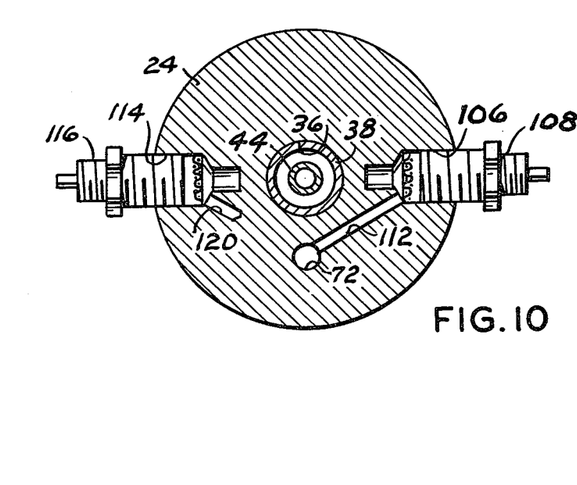
FIGS. 10 and 11 are vertical cross sectional views taken substantially along the lines 10—10 and 11—11 of FIG. 3; and, FIG. 12 is a view similar to FIG. 2, to another scale, with parts broken away for clarity, illustrating the position of the flapper lever when the float lever arm is horizontal or downwardly disposed.
Figure 11:
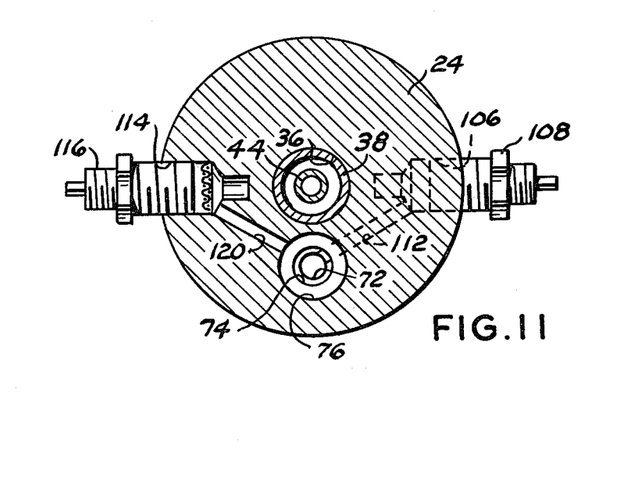

Intermediate its ends, the body 24 is provided with a lateral supply port 106 (FIGS. 10 and 11) which threadedly receives a supply fitting 108 connected by tubing 110 (FIG. 1) with the source 32. The supply fitting 108 communicates with the body offset bore 72 by an angular bore 112. The body is provided with a lateral pilot port 114 diametrically opposite the supply port 106 which similarly receives a pilot fitting 116 connected by tubing 118 (FIG. 1) with the actuator 34 of the dump valve 20. Similarly, an angular bore 120 provides pilot communication between the pilot fitting 116 and the body offset counterbore 76 (FIGS. 7 and 11). A centrally bored valve seat body 122 is threadedly received by the body offset counterbore 74. The seat body 122 is counterbored, as at 123, to define a valve seat 124 coaxially facing the center ring 80.

The valve assembly means 78 includes a generally cylindrical centrally bored and counterbored exhaust valve member 126 forming a chamber 127 having a lateral port 128 and having a diametrically reduced end portion, forming a throat 129, projecting through and secured to the first diaphragm 86 coaxial with the valve seat 124. A diaphragm bushing 131, coaxially secured to the second diaphragm 92, is secured to and closes the end of the exhaust valve chamber 126 opposite the valve seat 124. First and second ball valves 130 and 132 of unequal diameter are interconnected in selected spaced relation by a shaft 134 in dumbbell fashion with the valve 130 disposed in the valve seat counterbore 123 and seating and unseating on the valve seat 124. The valve 132 is disposed within the exhaust valve chamber 127 for seating and unseating on a valve seat 135. The ball valve 132 bears against a ball cap 136 normally urged coaxially toward the valve seat 124 by a resilient means, such as a spring 138. Other resilient means, such as a truncated conical spring 40 surrounds the valve seat body 122 within the counterbore 76 and bears against the first diaphragm 86 and valve assembly 78 for the purposes presently explained.

Figure 8:
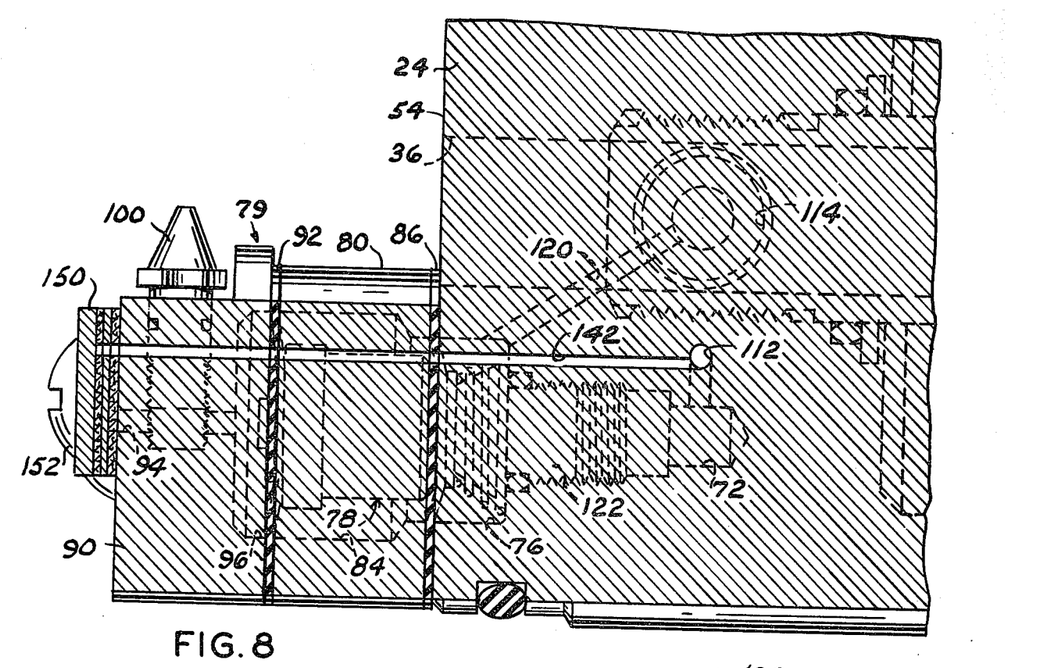
FIG. 8 is a fragmentary vertical cross sectional view, to a different scale, taken substantially along the line 8—8 of FIG. 4.

As shown by FIG. 8, a small diameter supply pressure restrictive bore 142 extends longitudinally through the valve cap 90, center ring 80, transversely through the diaphragms 86 and 92 and outer end portion of the body 24, in offset relation with respect to the valve assembly means and its surrounding counterbores and intersects the supply pressure angular bore 112.

Figure 9:
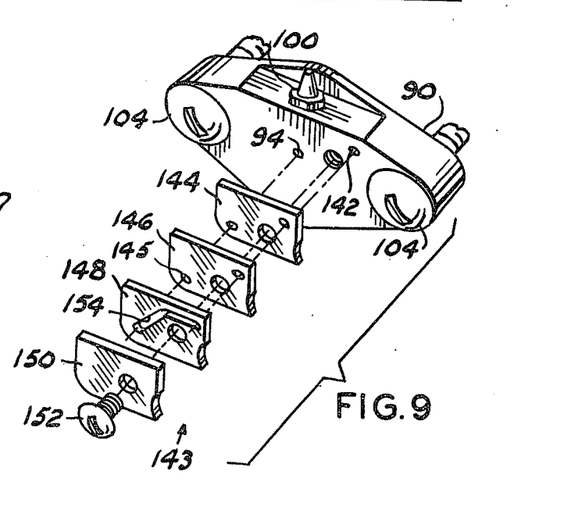
FIG. 9 is an exploded perspective view, to another scale, illustrating restrictive bores in restrictive plates.

As illustrated by FIG. 9, restrictive plate means 143, comprising a gasket 144, a plate 146 and a second gasket 148 are maintained in contiguous flat juxtaposed relation on the outer surface of the pilot valve cap 90 opposite the body end surface 54 by a restrictive cover plate 150 secured to the pilot valve cap by a screw 152. The gaskets 144-148 and restrictive plate 146 are cooperatively apertured to communicate with the valve cap bore 94. The restrictive bore 145 in the plate 147 forms a pressure supply orifice for the purpose presently explained. The restrictive bores 94 and 142 are joined by a slot 154 cut in the material of the restrictive gasket 148 thus providing gas pressure communication between the restrictive bore 142, valve cap bore 94, nozzle orifice 102 and the pressure chamber 96.

Referring again to FIG. 12, the flapper means 55 comprises a strap-like flapper 156 secured to the flapper lever bushing 48 and projects beyond the body end surface 54 in overlying relation with respect to the nozzle 100 and is provided with a flapper pad 158 which closes the nozle orifice 102 by pivoting movement of the flapper lever 44 when the float 56 is disposed below the horizontal. Resilient means, such as a spring 160, is interposed between the upper surface of the flapper 156 and a cover bushing 162, secured to the body outer end 54, to counterbalance the tube 44 and magnet 46 and insure positive closing contact of the flapper pad 158 with the tip of the nozzle 10, when the float is not above the horizontal. A cover 164 surrounds the outer end of the body and the valve assembly components secured thereto. The cover is provided with an aperture 165 (FIG. 2) for atmospheric communication.

OPERATION

Assuming the float control 22 is connected with the wall of the scrubber 10 with the supply fitting 108 connected with the source of gas pressure 32, for example 30 psi, and the pilot fitting 116 connected with the dump valve actuator 34. As long as the level of the fluid 16 maintains the float 56 either horizontal or toward the downward solid line position of FIG. 2, the repulsion between the magnets 46 and 60 maintains the magnet equipped end portion of the lever 44 horizontal or in an upward position with the nozzle orifice 102 closed by the flapper pad 158. Supply pressure through the restrictive passageway 142 and restrictive plate orifice 145, applies pressure through the valve cap bore 94 to the adjacent surface of the second diaphragm 92 which, by being greater in area than the area of the first diaphragm 86 also exposed to gas source pressure, biases both diaphragms and the valve assembly 78 toward the valve seat 124 until the reduced end of the exhaust valve chamber member 126 contacts the adjacent end of the valve seat body 122 and maintains the ball valve 130 seated on its seat 124. When the fluid level lifts the float 56 above the horizontal toward its dotted line position of FIG. 2 repulsion between the magnets biases the lever 44 downward within the isolation tube 38 thus lifting the flapper 156 to open the nozzle orifice 102 to the atmosphere. This bleeds off gas supply pressure against the diaphragm 92 in the pressure chamber 96 permitting the valve assembly 78 to move to the left, as viewed in FIGS. 6 and 7, by gas supply pressure against the ball valve 130 and adjacent area of the first diaphragm 86 supplemented by the force of the conical spring 140, thus moving the entire valve assembly 78 in a snap action axially away from the valve seat 124 as seen in FIG. 7. Simultaneously with this action the larger ball valve 132 is biased to its seat 135 by the valve assembly spring 138 to prevent communication between the atmosphere and the supply pressure in the counterbore.

Supply pressure in the counterbore 76 then enters the pilot bore 120 and tubing 118 which triggers the dump valve actuator 34 to open the dump valve 20 and drain the liquid 16 from the scrubber 10 until the float, by the fall of the liquid level, is again disposed at least horizontal or in a downward position wherein repulsion again lifts the lever 44 to close the nozzle 102.

Supply pressure through the restrictive passageways again builds up in the pressure chamber 96 surface to bias the diaphragms and valve assembly to the right in a snap action, as viewed in FIG. 6, again seating the ball valve 130 on its valve seat 124 which interrupts gas supply pressure to the dump valve 20. It seems obvious that the level control 22 may be utilized to operate a pump and/or motor, not shown, supplying liquid to or removing liquid from a vessel in accordance with a desired liquid level therein.

Obviously, the float level 22 may be inverted from the position shown in the drawings for some applications wherein a low position of the float biases the lever 44 to maintain the nozzle orifice open and a high position of the float biases the lever 44 to close the nozzle orifice. In this event, the flapper spring 160 is omitted and a similar flapper spring, indicated by the dotted lines 166 (FIG. 12), is interposed between the flapper and adjacent surface of the valve cap in surrounding relation with respect to the converging tip of the nozzle.

Obviously, a second identical level control, indicated at 22' (FIG. 1) may be installed at a higher elevation as a liquid high level safety switch controlling other components in the event of malfunction of the dump valve or other components.

Obviously the invention is susceptible to changes or alterations without defeating its practicability. Therefore, I do not wish to be confined to the preferred embodiment shown in the drawings and described herein.

I claim:
1. A liquid level control, comprising:
   a body adapted for connection with a liquid containing vessel having a liquid drain or supply valve;
   lever means pivotally supported by said body for vertical pivoting movement of its respective end portions;
   float means pivotally supported within the vessel proximate said lever means for vertical pivoting movement in response to the rise and fall of liquid in the vessel;
   magnetic means supported by said lever means and said float means, respectively, in magnetic inductive relation for pivoting said lever means in a direction opposite the direction of pivoting movement of said float means;
   said body having a valve seat and having lateral bores forming a fluid pressure path through the body valve seat;

a source of fluid pressure connected with the liquid drain or supply valve through the lateral bores;

valve housing means secured to said body in communication with the lateral bores;

pressure-responsive valve means for receiving said fluid pressure therein and being supported by and disposed within the valve housing means for axial snap action movement toward and away from the body valve seat in response to changes in the fluid pressure within the pressure-responsive valve means; and, nozzle valve means and a nozzle orifice being interposed in the fluid pressure path between the pressure-responsive valve means and the atmosphere, said nozzle valve means is opened and closed by said lever means as a result of changes in the fluid pressure within the pressure-responsive valve means for fluid pressure biasing said pressure-responsive valve means toward and away from said body valve seat in response to the rise and fall of liquid in the vessel.

2. The level control according to claim 1 and further including:

diaphragm means including first and second spaced-apart diaphragms interposed in said valve housing means for reciprocably supporting said pressure-responsive valve means and said diaphragm means being acted upon by the fluid pressure within the pressure-responsive valve means for movement of said pressure-responsive valve means between the opened and closed positions.

3. The level control according to claim 2 in which said pressure-responsive valve means comprises:

valve member, forming a valve chamber open to the atmosphere, extending between said diaphragm means and having a centrally apertured reduced end portion forming a throat extending through said first diaphragm and defining a valve chamber seat opposite and coaxial with the body valve seat;

interconnected valves disposed at respective ends of the throat for respectively seating on said valve chamber seat and said body valve seat in accordance with the direction of movement of said pressure-responsive valve means; and, resilient means normally biasing said interconnected valves toward said body valve seat.

4. The level control according to claim 3 and further including:

restrictive plate means secured to said valve housing means opposite the body including at least one restrictive plate having a plate orifice forming a restriction in the fluid pressure path.

5. The level control according to claim 4 and further including:

flapper means secured to said lever means for movement with said lever means toward and away from said nozzle orifice; and, other resilient means biasing said flapper means in one direction.

6. The level control according to claim 5 in which said float means includes:

a float arm pivotally connected with said body; and,
a float secured to said float arm.

7. The level control according to claim 6 in which said magnetic means includes:

an elongated first permanent magnet supported by said lever means; and, a second elongated permanent magnet supported by said float arm in axial alignment with said first permanent magnet when said float arm is horizontally disposed.

8. The level control according to claim 7 in which said interconnected valves comprise:

a first ball valve disposed at the body valve seat end of the throat;

a second ball valve disposed within the valve chamber; and, means interconnecting the ball valves.

9. A liquid level control, comprising:

a body adapted for connection with a liquid containing vessel having a liquid drain or supply valve;

means supported by said body including a socket forming member having its closed end projecting toward the interior of the vessel;

float means pivotally supported within the vessel proximate the closed end of the socket for vertical pivoting movement in response to the rise and fall of liquid in the vessel;

lever means extending into the socket and pivotally supported by said body for vertical pivoting movement;

magnetic means supported by said lever means and said float means, respectively, in close spaced relation for pivoting the socket contained end portion of said lever means by magnetic repulsion in a direction opposite the direction of pivoting movement of said float means, said body having a bore defining a valve seat in its end portion opposite the vessel and having first and second lateral bores communicating with respective end portions of the body bore at opposing ends of the body valve seat;

a source of fluid pressure connected with the liquid drain or supply valve through the lateral bores;

valve housing means secured to said body coaxial with the valve seat;

pressure responsive valve means for receiving said fluid pressure therein and being supported by and disposed within the valve housing means for axial movement toward and away from said valve seat in response to changes in the fluid pressure within the pressure-responsive valve means, said valve housing means and the adjacent end portion of said body having fluid pressure passageways therein providing communication between said first lateral bore and the pressure responsive valve means axially opposite the valve seat for fluid pressure biasing said pressure responsive valve means in a snap action to seat on said valve seat; and, nozzle valve means intersecting the fluid pressure passageways and having an orifice opened and closed by said lever means as a result of changes in the fluid pressure within the pressure-responsive valve means for opening the fluid pressure passageways to the atmosphere when said lever means opens the orifice, whereby when the orifice is opened fluid pressure biases said pressure responsive valve means away from said valve seat and communicates with the said second lateral bore and when said orifice is closed the fluid pressure is received within the pressure-responsive valve means through the first lateral bore for fluid pressure biasing said pressure-responsive valve means toward said valve seat.

10. The level control according to claim 9 and further including:
first diaphragm means including a first diaphragm interposed between said valve housing means and said body for supporting one end portion of said pressure-responsive valve means; and,
second diaphragm means including a second diaphragm transversely intersecting said valve housing means for supporting the other end portion of said pressure-responsive valve means and said first and second diaphragm means being acted upon by the fluid pressure within the pressure-responsive valve means for movement of said pressure-responsive valve means between the opened and closed positions.

11. The level control according to claim 10 in which said pressure-responsive valve means comprises:
a valve member forming a valve chamber open to the atmosphere and extending between said diaphragm means and having a centrally apertured reduced end portion forming a throat extending through said first diaphragm coaxial with the body valve seat and defining a valve chamber seat coaxial with the body valve seat;
interconnected valves disposed at respective ends of the throat for respectively seating on said valve chamber seat and said body valve seat in accordance with the direction of movement of said pressure-responsive valve means; and,
resilient means normally biasing said valves toward said body valve seat.

12. The level control according to claim 11 and further including:
restrictive plate means secured to said valve housing means opposite the body including at least one apertured plate communicating with and forming a restriction in the fluid pressure passageways.

13. The level control according to claim 12 and further including:
flapper means secured to said lever means for movement with said lever means toward and away from said nozzle orifice; and,
other resilient means biasing said flapper means in one direction.

14. The level control according to claim 13 in which said float means includes:
a float arm pivotally connected with said socket forming member; and,
a float secured to said float arm.

15. The level control according to claim 14 in which said magnetic means includes:
an elongated first permanent magnet axially supported by said lever means; and,
a second elongated permanent magnet supported by said float arm in axial alignment with said first permanent magnet when said float arm is horizontally disposed.

16. The level control according to claim 15 in which said interconnected valves comprise:
a first ball valve disposed at the body valve seat end of the throat; and,
a second ball valve disposed within the valve chamber.

* * * * *